United States Patent [19]

Maher et al.

[11] Patent Number: 4,961,070
[45] Date of Patent: Oct. 2, 1990

[54] RADIO CONSOLE WITH CRT DISPLAY

[75] Inventors: John W. Maher, Woodstock; Keith I. Mulford, Arlington Heights; James C. Tykal, Streamwood, all of Ill.

[73] Assignee: Motorola, Inc., Schaumburg, Ill.

[21] Appl. No.: 202,652

[22] Filed: Jun. 2, 1988

[51] Int. Cl.$^5$ ............................................. G09G 5/14
[52] U.S. Cl. ................................. 340/721; 340/731; 340/734; 364/521; 364/900; 364/927.63; 364/927.632; 455/158
[58] Field of Search ............... 340/721, 724, 731, 734; 364/521; 455/151, 158

[56] References Cited

U.S. PATENT DOCUMENTS 4,718,112  1/1988  Shinoda ............................. 455/171
4,789,962  12/1988  Berry et al. ........................ 340/721

Primary Examiner—Jeffery A. Brier
Attorney, Agent, or Firm—Steven G. Parmelee

[57] ABSTRACT

A radio console having a CRT display that allows channel control windows (CCWs) to be moved about a work area or from a summary list to a work area and back again. The CCWs may be of various sizes, and the display provides helpful indications of suitable locations to where selected windows may be moved. The display also allows preselected windows to be linked one to another, and to ensure that when one of the linked windows is moved, the remaining linked windows are moved in tandem with it. Also, if a window is manipulated to cause it to occlude an adjacent window, a distinct border is provided for the occluding window to indicate to the user that such occlusion heat occurred.

12 Claims, 6 Drawing Sheets

Microfiche Appendix Included
(161 Microfiche, 2 Pages)

© COPYRIGHT 1988 MOTOROLA, INC.

| HDQRTS | | SUBFLT C CALL ID BSY P-1 ▟3▮ | SUBFLT F CALL ID BSY P-3 ▟4▮ | SUBFLT J CALL ID BSY P-2 ▟5▮ | SUBFLT M ▟2▮ | MAIN ALARM 1 MNDR CLS SDDR CLS BKDR OPN | SUBFLT A SUBFLT B SUBFLT C SUBFLT D SUBFLT E |
|---|---|---|---|---|---|---|---|
| ▟5▮ NORTH DVP OFF RPT OFF NO ALARM | | SUBFLT D CALL ID TX P-3 ▟6▮ | SUBFLT G CALL ID BSY P-2 ▟2▮ | SUBFLT K CALL ID TX P-1 ▟4▮ | NORTH DVP OFF RPT OFF NO ALARM | 501 | SUBFLT F SUBFLT G SUBFLT H SUBFLT I SUBFLT J |
| SUBFLT A CALL ID BSY P-2 ▟3▮ | SUBFLT B CALL ID BSY P-3 ▟4▮ | SUBFLT E CALL ID BSY P-3 ▟2▮ | SUBFLT H CALL ID BSY P-1 ▟5▮ | SUBFLT L CALL ID BSY P-3 ▟3▮ | DOOR STAT ST1 CLSD ST2 CLSD ST3 OPEN ST4 CLSD ST5 CLSD | | SUBFLT K SUBFLT L SUBFLT M SUBFLT N DOOR STAT TRK STAT HDQRTRS ↑ ↓ |
| | TRK STAT TRUNKING | | SUBFLT A CALL ID BSY P-2 ▟4▮ | | | | |

MOVE WINDOWS
CHANNEL: HDQRTRS
QUIT

MOVING WINDOW
04:45:11  05/13/88

| MULTI SEL/APB | PATCH | INDIV CALL | DISPLAY | SPECIAL | HELP |

© COPYRIGHT 1988 MOTOROLA, INC.

FIG.6

| HDQRTS | | SUBFLT C CALL ID BSY P-1 ▟3▮ | SUBFLT F CALL ID BSY P-3 ▟4▮ | SUBFLT J CALL ID BSY P-2 ▟5▮ | SUBFLT M ▟2▮ | MAIN ALARM 1 MNDR CLS SDDR CLS BKDR OPN | SUBFLT A SUBFLT B SUBFLT C SUBFLT D SUBFLT E |
|---|---|---|---|---|---|---|---|
| ▟5▮ NORTH DVP OFF RPT OFF NO ALARM | | SUBFLT D CALL ID TX P-3 ▟6▮ | SUBFLT G CALL ID BSY P-2 ▟2▮ | SUBFLT K CALL ID TX P-1 ▟4▮ | NORTH DVP OFF RPT OFF NO ALARM | | SUBFLT F SUBFLT G SUBFLT H SUBFLT I SUBFLT J |
| SUBFLT A CALL ID BSY P-2 ▟3▮ | SUBFLT B CALL ID BSY P-3 ▟4▮ | SUBFLT E CALL ID BSY P-3 ▟2▮ | SUBFLT H CALL ID BSY P-1 ▟5▮ | SUBFLT L CALL ID BSY P-3 ▟3▮ | DOOR STAT ST1 CLSD ST2 CLSD ST3 OPEN ST4 CLSD ST5 CLSD | | SUBFLT K SUBFLT L SUBFLT M SUBFLT N DOOR STAT TRK STAT HDQRTRS ↑ ↓ |
| | TRK STAT TRUNKING | | SUBFLT A CALL ID BSY P-2 ▟4▮ | | | | |

303 —
MOVE WINDOWS
CHANNEL: SUBFLT M MOVE
QUIT  INTO THE LIST ONLY

MOVING WINDOW
04:45:11  05/13/88

| MULTI SEL/APB | PATCH | INDIV CALL | DISPLAY | SPECIAL | HELP |

© COPYRIGHT 1988 MOTOROLA, INC.

© COPYRIGHT 1988 MOTOROLA, INC.

FIG. 10

© COPYRIGHT 1988 MOTOROLA, INC.

FIG. 11

© COPYRIGHT 1988 MOTOROLA, INC.

FIG. 12

© COPYRIGHT 1988 MOTOROLA, INC.

4,961,070

RADIO CONSOLE WITH CRT DISPLAY

MICROFICHE APPENDIX

This specification includes a microfiche appendix comprising 2 microfiche and 161 frames.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

TECHNICAL FIELD

This invention relates generally to displays, and particularly to radio consoles having cathode ray tube (CRT) displays.

BACKGROUND ART

Radio communication systems are becoming more complex. Many systems include numerous channels that must be monitored and controlled by one or more dispatchers. As these systems grow in size and complexity, so grow the consoles A need exists for a compact radio console that can conveniently accommodate a large number of channels and options in a complex communication system. Such a console should be readily and easily configurable and reconfigurable to suit the needs of a particular user. Such a console should make channel monitoring and control relatively simple and assured, even in an emergency situation.

SUMMARY OF THE INVENTION

These needs and others are substantially met through provision of the radio console having a CRT display disclosed below. The display is subdivided into four primary display areas; a summary list area, a status area, a menu area, and a work area. The summary list area provides a summary indication of all channels available to the operator The status area provides information regarding current display and control operations and other information as may be appropriate. The menu area provides for display of various menus that allow an operator to configure, reconfigure, and otherwise use the radio console. Finally, the work area provides a display area where more detailed information regarding selected channels can be displayed.

In one embodiment, each channel comprises an information group having a preselected display window configuration associated therewith which may be any of three sizes. The first window comprises a small square, the second window comprises a rectangle having twice the area of the first, and the third window comprises a large square that is twice again as large as the second window. Any of these three windows can be the preselected default configuration for each channel.

When moving a window about the work area, or from the summary list area to the work area, the display identifies all locations the work area that can accommodate that display window configuration and that will avoid having the moved window occlude any portion of any other window. The operator selects one of the identified locations, and the window will move to that location.

In another embodiment, two or more channels may be linked to one another as may be appropriate in a given application. To the extent that two or more channels are linked together in this way, they are automatically moved as a group when the operator seeks to move one of them. To facilitate the move, the display also provides an indication of all locations that can accommodate both the selected window and any linked windows.

In another embodiment, the operator can select any one of the display window configurations described above for any channel at any time. For example, the operator may select to reconfigure a particular window from the smallest size to the largest size. If, when making such a change, the newly configured window occludes a part or all of an adjacent window, a unique indicia will be provided to indicate that such occlusion has occurred and to warn the operator of this condition. The unique indicia can be, for example, a uniquely colored border disposed around the occluding window. DR

BRIEF DESCRIPTION OF THE DRAWINGS

FIG. 5 comprises a depiction of the display with a window move option selected;

FIG. 6 comprises a depiction of the display with a window move option selected;

BEST MODE FOR CARRYING OUT THE INVENTION

Figure 1:
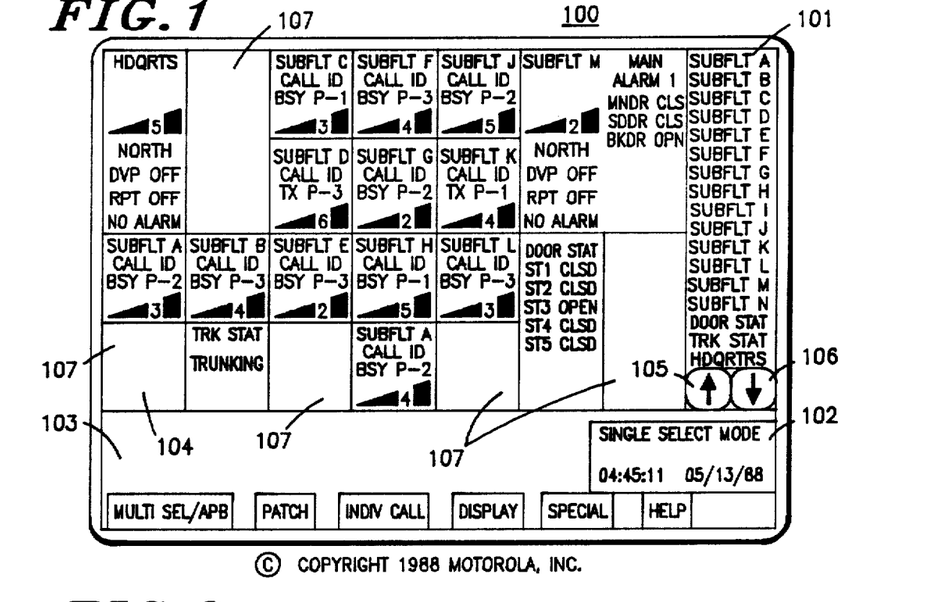
FIG. 1 comprises a general depiction of the console display.

Referring now to the drawings, and in particular to FIG. 1, the radio console of the invention includes a CRT display (100). The display may be established, and the channel monitoring and control functions implemented through use of, for example, an IBM PS/2 computer system. Preferably, the display will comprise a color display. The system should include a DOS operating system and a C Power Windows runtime utility as available through Entelekon. The system should also include the computer program included in the microfiche appendix that is included herewith, and a mouse controller.

The display (100) includes 4 general sub-display areas. These are a summary list area (101), a status area (102), a menu area (103) and a work area (104).

The summary list area (101) provides a listing of all channels that are supported by the console. At the bottom of the summary list area (101) is an upward pointing arrow (105) and a downward pointing arrow (106). By placing a mouse pointer on either arrow and utilizing the appropriate mouse control button, the displayed summary list can be scrolled upwardly or downwardly to view other channels that may also be included in the summary list.

The status area (102) provides an indication of the current operating mode of the radio console. In FIG. 1, a Single Select Mode indication appears in the status area (102) to identify the current operating mode of the radio console. The status area (102) may also provide a time of day indication and a calendar date indication as depicted in FIG. 1.

Figure 2:
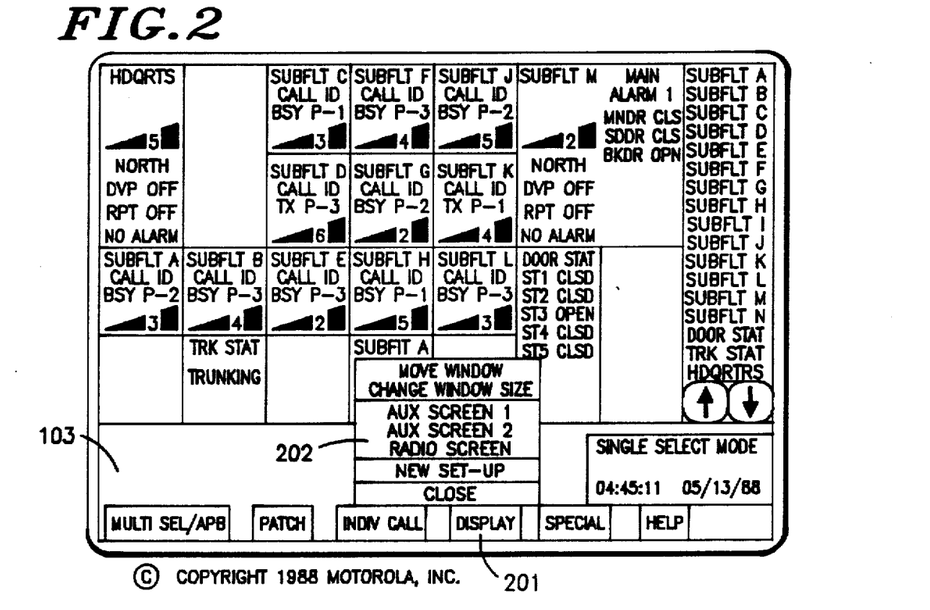
FIG. 2 comprises a depiction of the display with one of the menus being displayed.

The menu area (103) comprises an area of the display dedicated to the display of various menus that can be selected by the operator. No channel control windows can be displayed in the menu area (103). At the bottom of the menu area (103) are various menu options that can be selected by the operator through use of the mouse. With momentary reference to FIG. 2, if the operator selects the Display (201) option, a Display menu (202) appears that allows the user to select from a variety of display related commands and controls. After completing the desired display options, the operator can select the Close option and the menu will be removed from the display.

Referring again to FIG. 1, the work area (104) provides a space where windows comprising channel control windows (CCW) can be selectably displayed. In those locations where no CCWs are located, an appropriate background color can be displayed as indicated by the reference numeral 107. (The background in the menu area (103) and in the work area (104) may of course be the same color if desired.)

The CCWs themselves can be one of any of three configurations. The first configuration comprises a small rectangle, such as a square. FIG. 1 depicts this first CCW configuration in conjunction with Subfleet A, Subfleet B, Subfleet C and others. A second CCW configuration comprises a rectangle having twice the area of the first CCW configuration. This second CCW configuration can be seen as depicted in conjunction with the Headquarters window. Finally, the third CCW configuration comprises a rectangle (in this case a square) that is twice the size of the second CCW configuration. In FIG. 1, such a third CCW configuration is depicted in conjunction with the display of Subfleet M information.

Each channel has associated with it a preselected, or default, CCW configuration. When moving a channel from the summary list (101) to the work area (104), the initial display of that channel's information will be in association with the default CCW configuration. The operator can then change that CCW configuration to either of the remaining two CCW configuration possibilities if desired. In general, the larger display windows are appropriate for use with channels that support a larger number of options, and the smaller display windows are appropriate for use with channels that do not currently support as many options, or for which the display of such options is not currently necessary.

Figure 3:
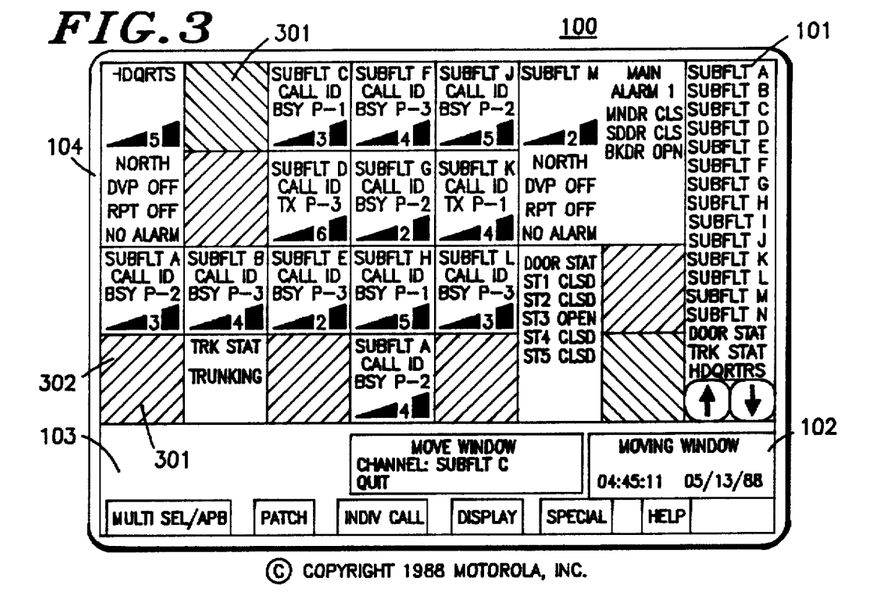
FIG. 3 comprises a depiction of the display with a window move option selected.

Referring now to FIG. 3, the CCWs can be moved from one location to another within the work area (104), or from the summary list (101) to the work area (104). For example, by selecting the window move option from the display menu (201 and 202) (FIG. 2) as referred to earlier, the Move Window mode will be selected. The status area (102) will provide an indication of this and a menu window (303) relating to the window move control will be provided in the menu area (103). By appropriate use of the mouse, the operator can then select a CCW that he desires to move, either from the summary list (101) or from the work area (104). For purposes of this example, it will be presumed that the operator selects the Subfleet C channel as depicted in the work area (104).

The Subfleet C channel has associated with it the smallest CCW configuration. Upon selecting this channel, the display provides an indication of all locations that can then currently accommodate that size CCW configuration without occluding any adjacent windows. Such available locations are depicted in FIG. 3 through the use of specially colored areas, such as those depicted by cross hatching and the numeral 301. The operator then selects any one of the indicated locations (301) by locating the mouse pointer within the desired location and selecting the appropriate mouse button.

Figure 4:
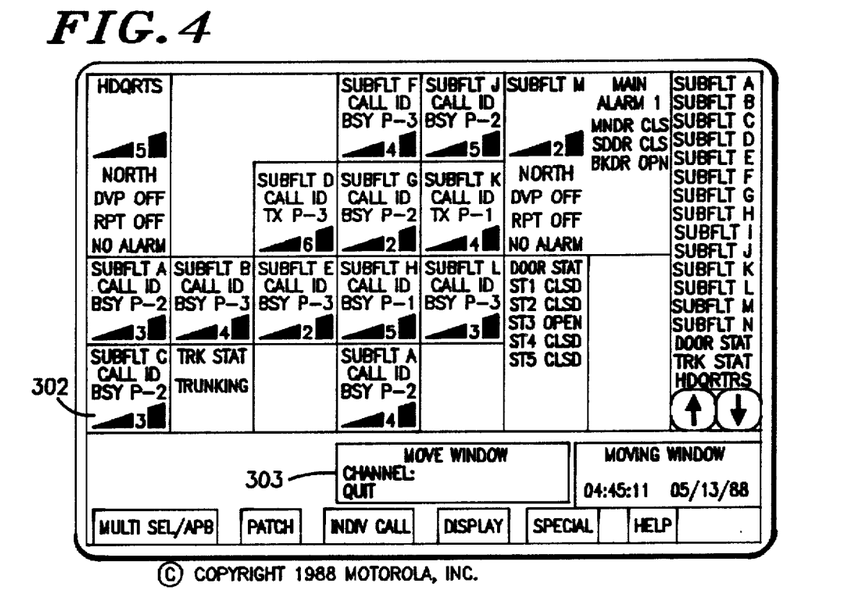
FIG. 4 comprises a depiction of the display with a window move completed.

Presuming the operator selects the location indicated by the numeral 302, the Subfleet C CCW will be moved to that location (302) as depicted in FIG. 4. The remaining available locations will revert to the normal background color. The operator can then select another channel to move, or conclude the process by selecting "Quit" from the menu area (303).

With reference to FIG. 5, the operator can also seek to move a medium sized CCW such as that used to depict Headquarters information. Upon indicating a desire to move this channel, the display again identifies those locations that can accommodate a CCW of that size without occluding adjacent windows. In the example depicted, only two locations can accommodate a CCW of this size, as depicted by the numeral 501. The console will not allow the operator to move the headquarters CCW to any other location. As above, the operator can select either of the available locations (501) by placing the mouse pointer in either location (501) and selecting the appropriate mouse button With reference to FIG. 6, the operator can also seek to move the Subfleet M information which has been displayed in the largest CCW. There are no locations available to accommodate a window of this size, however, and hence no receipt locations are indicated. Instead, in the window move menu (303), a message notes that this information can only be moved into the summary list (101). (In the alternative, the operator could reduce the size of the Subfleet M CCW such that one of the available smaller spaces could then accommodate it.)

Figure 7:
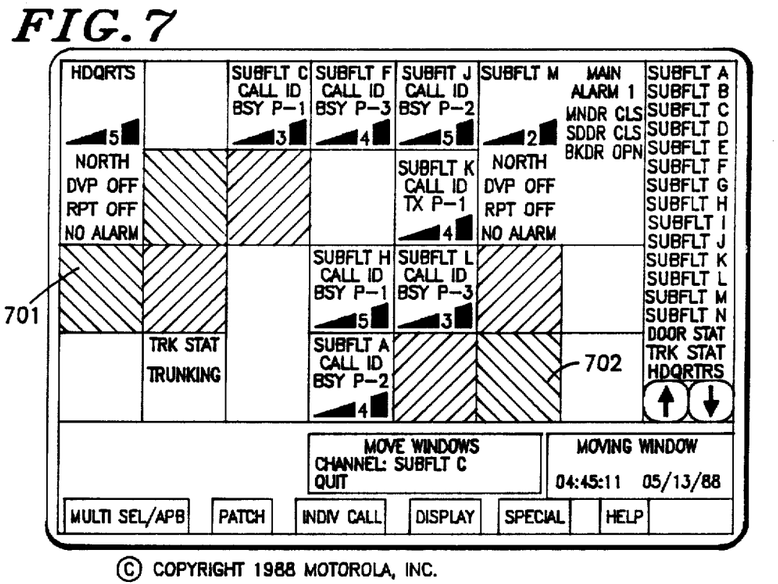
FIG. 7 comprises a depiction of the display with a window move option selected for a pair of linked windows.

When configuring the console, the operator may elect to link certain channels together When linked, the two channels are always displayed together to ensure proper operation of the communication system. In FIG. 7, for the purposes of this example, it will be presumed that the Subfleet C channel and the Subfleet F channel are linked as described above.

Figure 8:
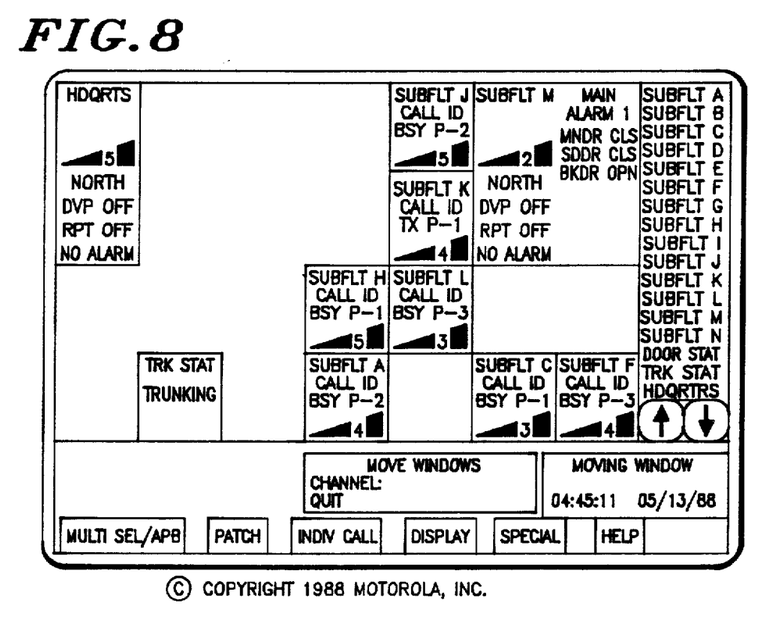
FIG. 8 comprises a depiction of the display with a window move option for a pair of linked windows completed.

If the operator elects to move the Subfleet C CCW, the display will indicate those locations where both the Subfleet C and Subfleet F CCWs can be displayed together without occluding adjacent windows. The locations that fit both criteria are depicted through the use of a different foreground color and can be seen, for example, as indicated by the cross hatching and the numeral 701. Those locations that are vacant but that cannot accommodate the linked pair are simply represented by the usual background color. If the operator then selects the location indicated by the reference numeral 702, both the Subfleet C and Subfleet F CCWs will be moved to the new location as depicted in FIG. 8.

Both channels are moved in this linked fashion regardless of whether the operator was initially cognizant of the linked nature of the Subfleet C channel. In this way, the system ensures that linked channels will remain linked and appropriately displayed to ensure the convenient and accurate operation of the system.

Figure 9:
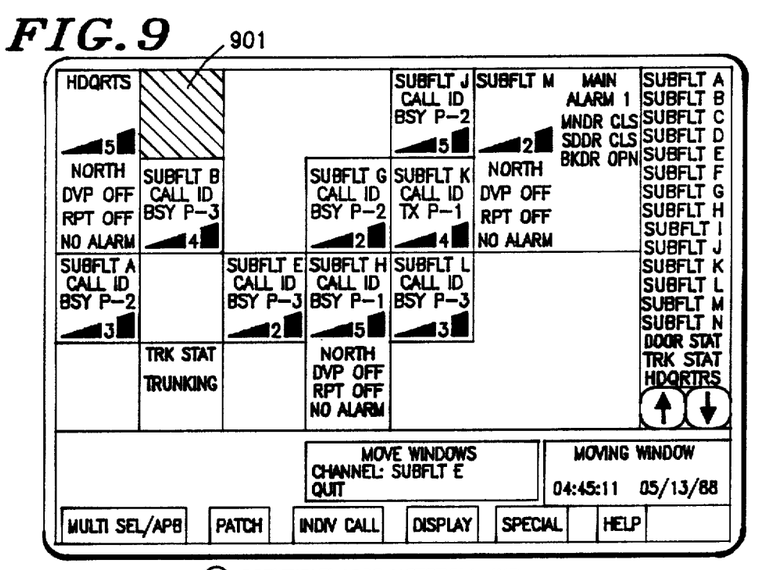
FIG. 9 comprises a depiction of the display with a window move option for a trio of linked windows selected.

With reference to FIG. 9, the Subfleet E, Subfleet H and Subfleet L CCWs are all linked. Given this configuration, if the operator seeks to move the Subfleet E CCW, the only location to which the three linked CCWs can be moved is depicted by the reference numeral 901. If the dispatcher selected this location, all three CCWs would be moved to the new location, with the Subfleet E CCW occupying the space denoted by the reference numeral 901.

With momentary reference again to FIG. 1, the Subfleet F CCW comprises a small window, and is bordered above by the boundaries of the display and on all other sides by adjacent CCWs. The Subfleet F CCW could therefore not be expanded to a larger size without occluding an adjacent CCW. For example, if the Subfleet F CCW were expanded to a medium sized CCW, the Subfleet G CCW would be occluded.

Figure 10:
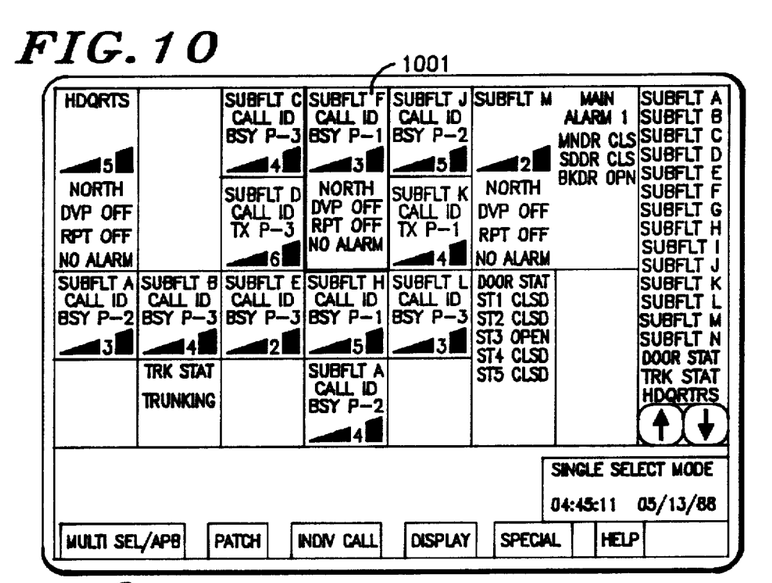
FIG. 10 comprises a depiction of the display wherein one window occludes another.

Since it is appropriate to allow an operator to make such an enlargement from time to time, and with reference to FIG. 10, a unique indicia, such as a distinct color border (1001), is provided about a CCW when that CCW has been expanded and occludes an adjacent CCW. This border (1001) should of course be different in color from the background shading and other colors used in the display.

Figure 11:
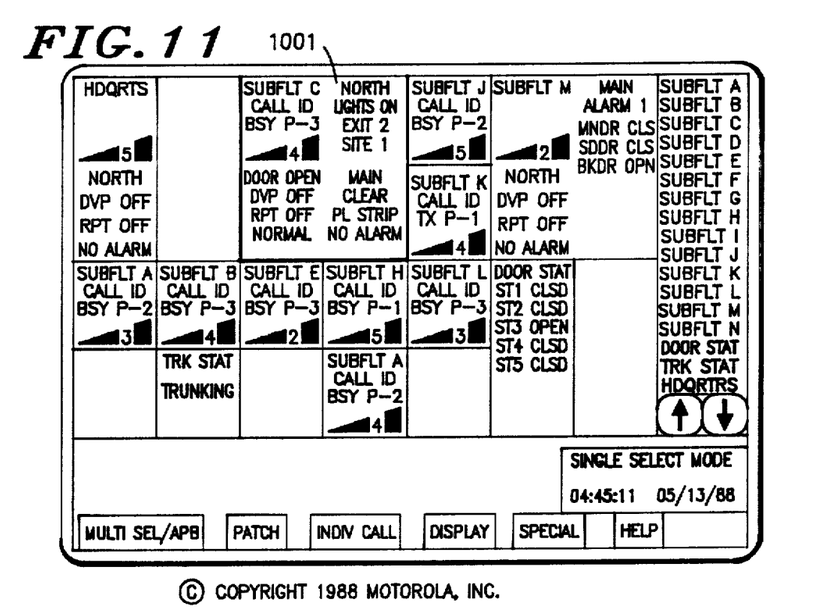
FIG. 11 comprises a depiction of the display wherein one window occludes two others.

With continued reference to FIG. 10, if the operator then decides to enlarge the Subfleet C CCW to the largest sized CCW, this will cause occlusion of the Subfleet D CCW and the Subfleet F CCW, the latter also occluding the Subfleet G CCW. As depicted in FIG. 11, such occlusion has occurred, and the Subfleet C CCW now includes the distinct border (1001) that indicates to the user that the CCW contained within the border (1001) currently occludes other CCWs.

Figure 12:
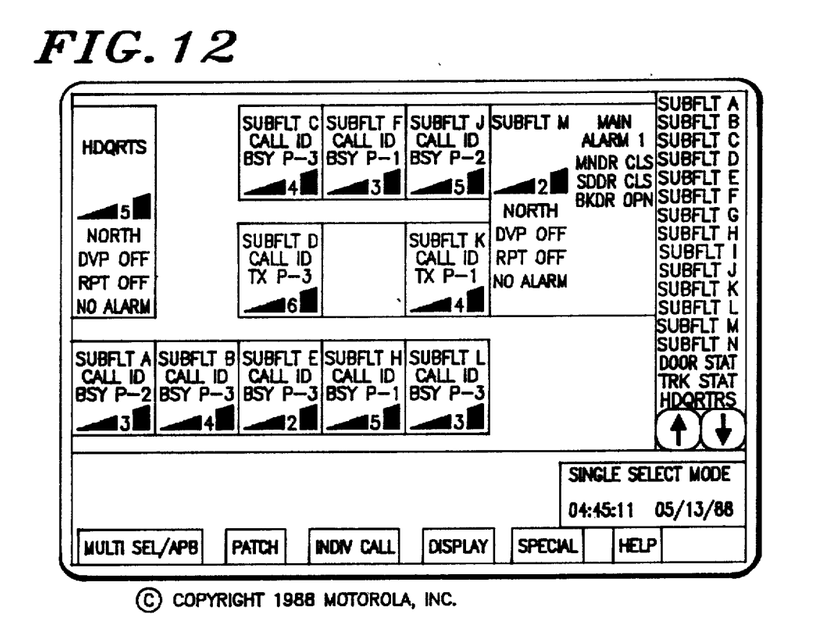
FIG. 12 comprises a depiction of an alternative embodiment.

Various modifications could of course be made. For example, with reference to FIG. 12, fewer rows of CCWs can be located in the work area, as depicted. In addition, the work area could be enlarged at the expense of the menu area, or vice versa.

We claim:

1. A method of displaying, on a display, information selected from a plurality of information groups, wherein at least some of said information groups have a preselected display window configuration associated therewith, comprising the steps of:
    (A) selecting, by an operator, one of said plurality of information groups to form a selected information group;
    (B) automatically identifying, when available, at least one location on said display that can then accommodate said preselected display window configuration associated with said selected information group without allowing said preselected display window configuration to occlude any other information group then currently displayed on said display to form identified locations;
    (C) automatically displaying said identified locations on said display;
    (D) selecting, by the operator, one of said identified locations to receive the selected information group.

2. The method of claim 1 wherein said preselected display window configuration can be any of three predetermined sizes 3. The method of claim 1 wherein each of said preselected display window configurations comprises a rectangle.

4. The method of claim 1 wherein said preselected display window configuration can be any of:
    (A) a first rectangle shaped window;
    (B) a second rectangle shaped window being twice as large as said first rectangle shaped window; and
    (C) a third rectangle shaped window being twice as large as said second rectangle shaped window.

5. The method claim 1 wherein said information group can be selected from a summary list displayed on said display.

6. The method of claim 1 wherein said information group can be selected from an information group already displayed on said display in a display window.

7. The method of claim 1 wherein said preselected display window configuration can be any of:
    (A) a first rectangle shaped window;
    (B) a second rectangle shaped window being larger than said first rectangle shaped window; and
    (C) a third rectangle shaped window being larger than said second rectangle shaped window.

8. The method of claim 1 wherein said information group can be selected from either of
    (A) a summary list displayed on said display;
    (B) an information group already displayed in a display window on said display.

9. In a radio control console having a display, a method of displaying channel information for any of a plurality of channels on said display, wherein at least some of said plurality of channels each have associated therewith a preselected display window configuration, the method comprising the steps of:
    (A) providing a selected channel by selecting, through an operator, a channel from a summary list of channels;
    (B) automatically providing identified locations by identifying, when available, at least one location on said display that can then accommodate said preselected display window configuration to occlude any other channel information then displayed on said display;
    (C) automatically displaying said identified locations on said display;
    (D) selecting, by the operator, one of said identified locations to receive the selected channel.

10. A method of displaying, on a display, information selected from a plurality of information groups, wherein at least some of said information groups have a preselected display window configuration associated therewith and wherein at least one of said information groups is linked to at least one other of said information groups, comprising the steps of:
    (A) providing a selected information group by selecting, via an operator, a first information group from said plurality of information groups, wherein when said first information group has another second information group linked thereto, said selected information group including both said first information group and said another information group;

(B) automatically providing identified locations by identifying, when available, at least one location on said display that can accommodate all of said preselected display window configurations associated with said selected information group without allowing said preselected display window configurations to occlude any other information group then currently displayed on said display;

(C) automatically displaying said identified locations on said display;

(D) selecting, by the operator, one of said identified locations to receive the selected information group.

11. A method of displaying information in display windows on a display, wherein at least one of said display windows can be selectively varied in size, comprising the steps of:

(A) providing a selected display window by selecting said display window that can be varied in size;

(B) processing said selected display window to cause said selected display window to enlarge, wherein said processing includes providing said selected display window with a unique indicia whenever said processing causes said selected display window to occlude at least one other display window.

12. The method of claim 11 wherein said unique indicia includes a border at least partially disposed about said selected display window.

* * * * *

UNITED STATES PATENT AND TRADEMARK OFFICE
CERTIFICATE OF CORRECTION

PATENT NO. : 4,961,070

DATED : October 2, 1990

INVENTOR(S) : Maher et al.

It is certified that error appears in the above-identified patent and that said Letters Patent is hereby corrected as shown below:

In the Abstract

In the last line of the abstract between the word "occlusion" and "occurred" delete the word "heat" and insert thereat the word --has--.

Signed and Sealed this

Twenty-third Day of June, 1992

Attest:

DOUGLAS B. COMER

*Attesting Officer*   *Acting Commissioner of Patents and Trademarks*